United States Patent
Brooks

(10) Patent No.: US 9,024,815 B2
(45) Date of Patent: May 5, 2015

(54) DIRECT-TO-DIGITAL SOFTWARE-DEFINED RADAR

(75) Inventor: John W. Brooks, Huntsville, AL (US)

(73) Assignee: Brooks Engineering International, LLC, Huntsville, AL (US)

( * ) Notice: Subject to any disclaimer, the term of this patent is extended or adjusted under 35 U.S.C. 154(b) by 363 days.

(21) Appl. No.: 13/482,022

(22) Filed: May 29, 2012

(65) Prior Publication Data

US 2012/0313813 A1    Dec. 13, 2012

Related U.S. Application Data

(60) Provisional application No. 61/490,803, filed on May 27, 2011.

(51) Int. Cl.
G01S 13/58    (2006.01)
G01S 7/20    (2006.01)
G01S 7/288    (2006.01)

(52) U.S. Cl.
CPC .. *G01S 7/20* (2013.01); *G01S 7/288* (2013.01)

(58) Field of Classification Search
CPC .............................. G01S 13/885; G01S 13/89
USPC ............................................ 342/22, 162, 195
See application file for complete search history.

(56) References Cited

U.S. PATENT DOCUMENTS

| 5,325,095 | A | 6/1994 | Vadnais | |
|---|---|---|---|---|
| 5,438,692 | A | 8/1995 | Mohindra | |
| 5,446,461 | A | 8/1995 | Frazier | |
| 5,584,068 | A | 12/1996 | Mohindra | |
| 6,009,126 | A | 12/1999 | Bezooijen | |
| 6,181,734 | B1 | 1/2001 | Palermo | |
| 6,192,225 | B1 | 2/2001 | Arpaia et al. | |
| 6,512,475 | B1 * | 1/2003 | Bogatyrev et al. | 342/22 |
| 6,657,577 | B1 * | 12/2003 | Gregersen et al. | 342/22 |
| 6,882,834 | B1 | 4/2005 | Balboni | |
| 7,151,925 | B2 | 12/2006 | Ting et al. | |
| 7,511,654 | B1 * | 3/2009 | Goldman et al. | 342/22 |
| 7,528,762 | B2 | 5/2009 | Cerwin | |
| 7,607,494 | B2 | 10/2009 | Alft | |
| 7,953,184 | B2 * | 5/2011 | Lee et al. | 375/316 |
| 7,956,640 | B2 * | 6/2011 | Gupta et al. | 326/39 |
| 7,991,013 | B2 * | 8/2011 | Gupta et al. | 370/481 |
| 2007/0222661 | A1 * | 9/2007 | Stagliano et al. | 342/26 R |

(Continued)

OTHER PUBLICATIONS

Yeary, M.; Kelley, R.; Meier, J.; Ong, S.; Palmer, R., "Compact Digital Receiver Development for Radar Based Remote Sensing," Instrumentation and Measurement Technology Conference Proceedings, 2008. IMTC 2008. IEEE, vol., no., pp. 1761,1765, May 12-15, 2008.*

(Continued)

*Primary Examiner* — John B Sotomayor
*Assistant Examiner* — Marcus Windrich
(74) *Attorney, Agent, or Firm* — George P. Kobler; Lanier Ford Shaver & Payne P.C.

(57) ABSTRACT

A direct-to-digital software defined radar system includes a high-speed digitizer coupled directly to a receive antenna and outputs a digital signal to a processor which receives the digitized signal, along with an arbitrarily-defined reference signal provided by signal generator, and indexes the signal data according to time and geo-location, arranges the data according to a three-dimensional data structure, declutters and filters and refines the data for storage or display.

6 Claims, 7 Drawing Sheets

(56) References Cited

U.S. PATENT DOCUMENTS

2009/0009155 A1* 1/2009 Hosokawa et al. ........ 324/76.38
2009/0167589 A1 7/2009 Balsov
2010/0066585 A1 3/2010 Hibbard
2013/0093611 A1* 4/2013 Crowley et al. ................. 342/22

OTHER PUBLICATIONS

U.S. Appl. No. 13/122,475, filed Aug. 30, 2010, Morishita, Y., et al.
U.S. Appl. No. 12/281,668, filed Mar. 5, 2007, Hosokawa, Y., et al.
Griffiths, H.; "New Ideas in FM Radar"; Electronics Communication Engineering Journal; Oct 1990; pp. 185-194; vol. 2, No. 5.
Namgoong, W., et al; "Direct-conversion RF receiver design"; Communications, IEEE Transactions; Mar. 2001; pp. 518-529; vol. 49, No. 3.
Pan, J., et al; "DC offset and low frequency noise compensation for direct-conversion receiver in pulse compression Radar"; Antenna Technology (iWAT), 2011 International Workshop; Mar. 2011; pp. 255-258.
Loke, A, et al; "Direct conversion radio for digital mobile phones—design issues, status, and trends."; Microwave Theory and Techniques, IEEE Transactions; Nov. 2002; pp. 2422-2435; vol. 50, No. 11.
Harris, F, et al; "Software defined radio; Part 22 in a series of tutorials on instrumentation and measurement"; Instrumentation Measurement Magazine, IEEE; Feb. 2010; pp. 23-32; vol. 13, No. 1.
Mitola, J; "The software radio architecture"; Communications Magazine, IEEE; May 1995; pp. 26-38; vol. 33, No. 5.
Mitola, J; "Software radio architecture: a mathematical perspective"; Selected Areas in Communications, IEEE Journal; Apr. 1999; pp. 514-538; vol. 17, No. 4.

* cited by examiner

DIRECT-TO-DIGITAL SOFTWARE-DEFINED RADAR

CROSS-REFERENCE TO RELATED APPLICATIONS

This non-provisional application claims the benefit of priority to U.S. Provisional Patent Application No. 61/490,803, filed May 27, 2011, and incorporated by reference as if fully set forth herein.

BACKGROUND

1. Field

The present invention relates generally to radar systems, and, in particular to radar systems comprising direct-to-digital receive signal conversion.

2. Description of the Problem and Related Art

RF communications systems, including radar systems, employ a superheterodyne-generated wave modulated with an information signal that must be down-converted by a receiver to extract the information signal. It has been necessary to convert the RF energy that is received at the receiver antenna into a format that can be interpreted by a human, or computer, into a meaningful target image or display. This has been accomplished by down-converting the RF energy through one or more IF stages into a baseband frequency, at which point the target could be displayed on an oscilloscope or similar device. Conventional systems use an ever-increasingly complex series of amplifiers and filters to convert a received signal from an intermediate frequency (IF) signal to a baseband signal. Most such systems employ a local oscillator (LO) to essentially provide a reference signal of matching frequency to that received at the antenna in order to provide a template by which the received signal is multiplied, or correlated, with a mixer and then filtered.

Following the widespread availability of digital technology, the baseband signal was converted to digital formats by one or more ADCs and sent to a radar signal processor (RSP). The conversion of the baseband signal to digital format allowed for the rapid growth in complexity of modern radar. Some recent receiving process techniques have sought to bypass the IF stage through a direct conversion technique; however, even this class of receivers requires the use of an LO. The use of an LO still introduces a number of sources of error, among which include spurs, image-rejection issues, additional complex filtering, etc.

In recent years the separation between radar and communications hardware and software has become blurred to the point that modern radars use many of the same modulation techniques as modern radios. Of particular interest is the class of Orthogonal Frequency-Division Multiplex (OFDM) waveforms used in the cellular phone industry applied now to radar, and specifically to Ground Penetrating Radar.

As the complexity of modern radars and their waveforms increase, so also does the complexity of the receiver hardware, and the duration of the engineering design cycle. The concept of software-defined radio ("SDRadio"), gained prominence, the goal of which is to ultimately eliminate all receiver hardware and couple the receive antenna directly to a fast analog-to-digital converter (ADC). However, that goal has yet to be achieved in the domain of SDRadio. In the paper "Software-defined radio receiver: dream to reality", Bagheri, et. al., [29] show the continued reliance on the LO and mixers within the SDRadio architecture. The most recent research on SDRadio reveals the persistent use the LO and mixer hardware.

Likewise, elimination of hardware components and the adaptability of the system, has become a goal of radar design. But, such prior solutions still require RF down-conversion with the corresponding LO and mixer hardware.

This invention eliminates the need for radar receiver hardware, specifically the Local Oscillator (LO) and radio frequency (RF) and Intermediate Frequency (IF) Mixers, that have classically been employed since the inception of radar.

SUMMARY

For purposes of summarizing the invention, certain aspects, advantages, and novel features of the invention have been described herein. It is to be understood that not necessarily all such advantages may be achieved in accordance with any one particular embodiment of the invention. Thus, the invention may be embodied or carried out in a manner that achieves or optimizes one advantage or group of advantages as taught herein without necessarily achieving other advantages as may be taught or suggested herein.

An object of the invention described herein is to provide a direct-to-digital software-defined radar that eliminates the majority of receiver hardware, replacing that hardware with a high-speed analog-to-digital converter (ADC) such that signal and data processing is carried directly on the received and sampled radio frequency (RF) data. No Intermediate Frequency (IF) or Baseband frequency data is required. This arrangement improves the processing of data, by eliminating the errors introduced by the hardware.

A further object is to significantly reduce radar system development time by eliminating the design cycle for those hardware components.

Yet another object is to provide a radar system that allows flexible and rapid reconfiguration of the radar system through adaptive waveform generation in response to changes in the target environment due to clutter, electromagnetic interference (EMI), and other environmental disturbances.

These and other embodiments of the present invention will also become readily apparent to those skilled in the art from the following detailed description of the embodiments having reference to the attached figures, the invention not being limited to any particular embodiment(s) disclosed.

BRIEF DESCRIPTION OF THE DRAWINGS

The present invention is described with reference to the accompanying drawings. In the drawings, like reference numbers indicate identical or functionally similar elements.

DETAILED DESCRIPTION

The various embodiments of the present invention and their advantages are best understood by referring to FIGS. 1 through 8 of the drawings. The elements of the drawings are not necessarily to scale, emphasis instead being placed upon clearly illustrating the principles of the invention. Throughout the drawings, like numerals are used for like and corresponding parts of the various drawings.

This invention may be provided in other specific forms and embodiments without departing from the essential characteristics as described herein. The embodiments described above are to be considered in all aspects as illustrative only and not restrictive in any manner. The appended claims rather than the following description indicate the scope of the invention.

Figure 1:
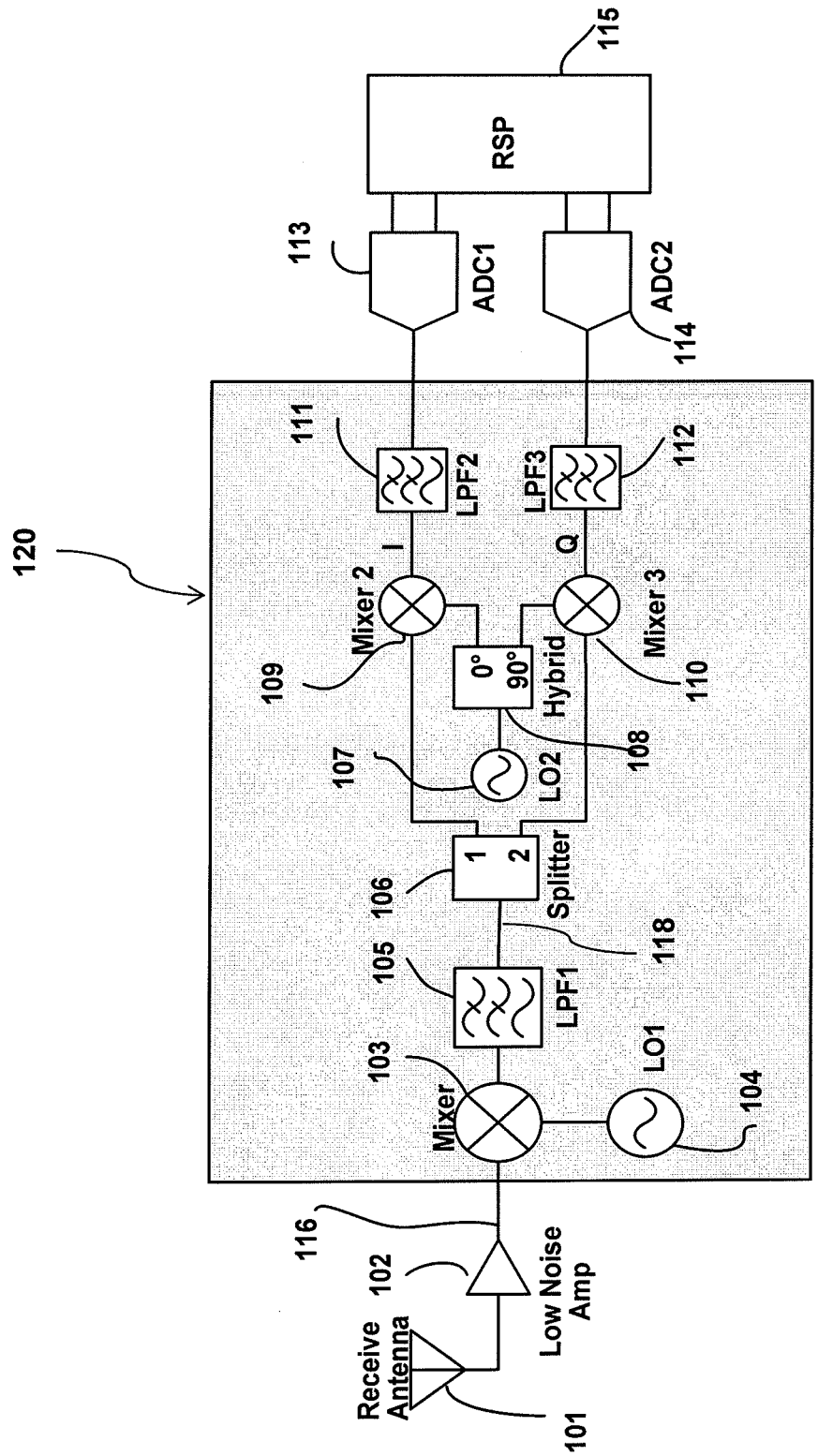
FIG. 1 is a functional schematic depicting a prior art superheterodyne radar receiver typically employed for pulse type radars.

FIG. 1 depicts a typical superheterodyne radar receiver with a receive antenna 101 that receives a reflected RF signal from a target and the signal is amplified by a low-noise RF amplifier 102. The amplified signal 116 is applied to an input of an RF mixer 103. The RF mixer 103 correlates the received signal 116 by a local oscillator signal 104, and the product is then low-pass filtered by the low pass filter 105. These operations are performed in order to shift the received signal 116 spectrum from a very high RF to an IF 118. The IF 118 is then divided into two paths via a splitter 106 and is then passed to baseband mixers 109 and 110, which multiply the IF signal 118 with quadrature phase replicas of the second local oscillator 107 which are passed through a hybrid circuit 108. The resulting in-phase (I) and quadrature (Q) signals are low-pass filtered by filters 111 and 112, then sampled (digitized) by the analog-to-digital converters (ADCs) 113 and 114. Those digital data are then applied to a radar signal processor (RSP) 115 for further processing. The section comprising the elements from LO1 104 to the second and third low pass filters 111, 112 is referred to herein as the down-conversion section 120.

Figure 2:
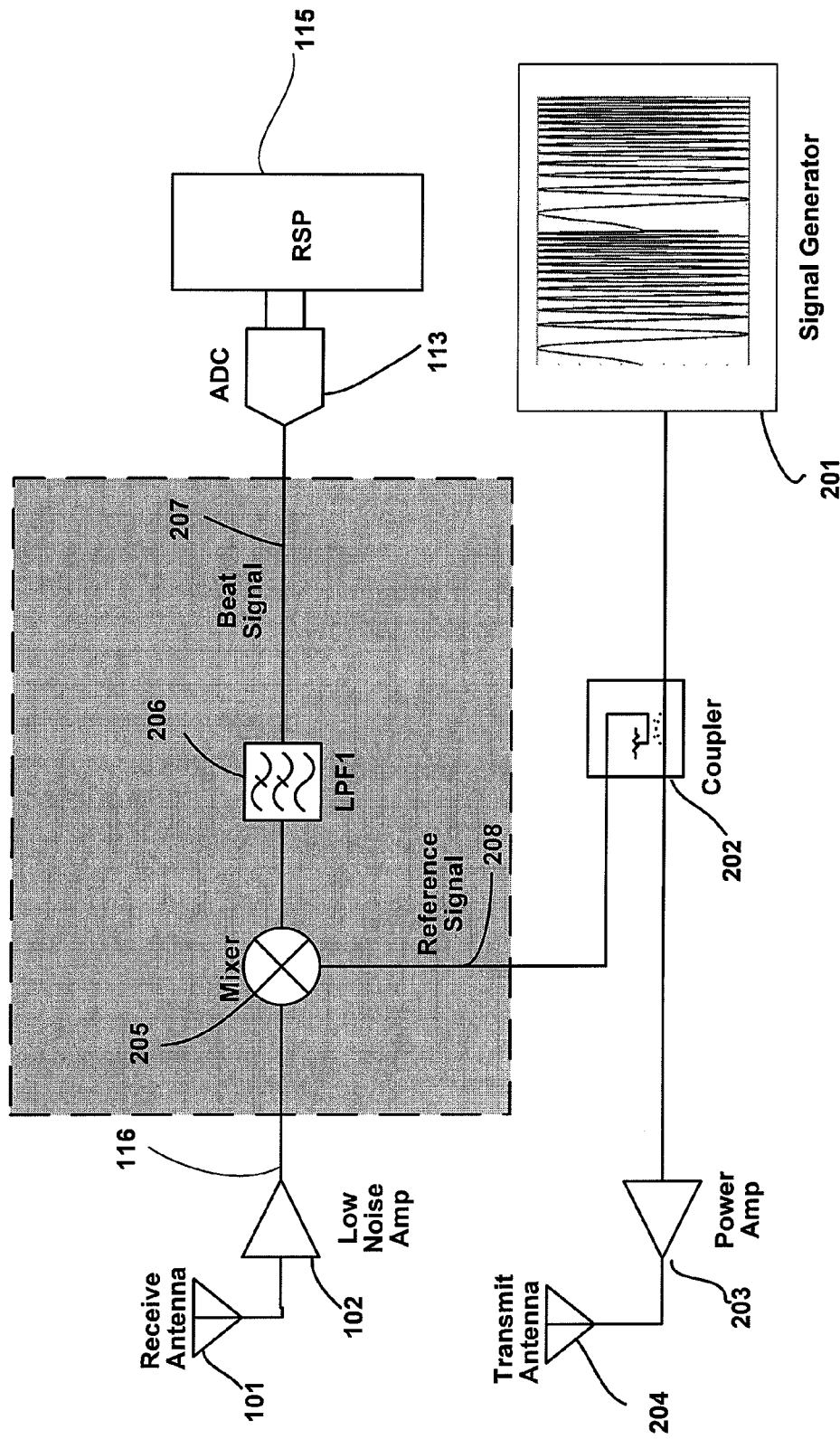
FIG. 2 is a functional schematic depicting a prior art transmitter and receiver for a radar that uses a reference waveform from the transmitter, in this case a Frequency Modulated (FM) waveform, although other waveforms are possible.

FIG. 2 depicts a conventional prior art radar transmitter and receiver as employed for frequency modulated (FM) or phase modulated (PM) waveforms, or any number of modern radar waveforms. In this example, the FM waveform is assumed. A signal generator 201 produces a linear FM waveform, an attenuated portion of which, called the Reference Signal 208, is directed by coupler 202 to mixer 205. Power amplifier 203 amplifies the bulk of the generated signal to the input of the transmit antenna 204. Upon reception form a target at receive antenna 101, the received RF signal is amplified by low noise RF amplifier 102 and that amplified signal 116 is multiplied in mixer 205 by the reference signal 208. Because the frequency of the amplified received signal 116 is very near the frequency of the reference signal 208 (for the case of an FM waveform), the result of the multiplication in mixer 205 is a "beat signal" 207, the components of which will be used to determine the range to the target.

Figure 3:
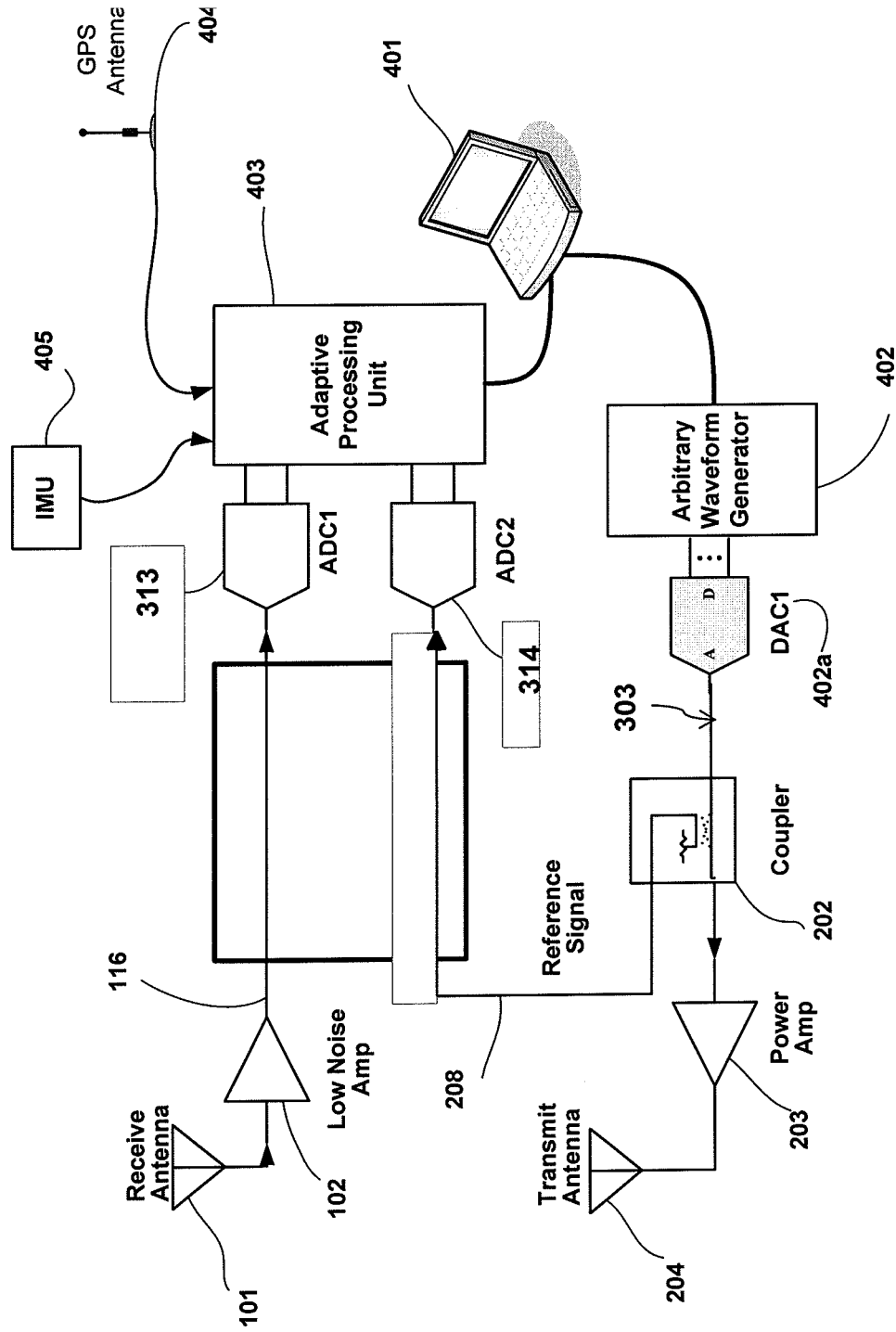
FIG. 3 is a functional schematic depicting an exemplary implementation of a direct-to-digital software defined radar system.

With reference now to FIG. 3, an exemplary direct-to-digital software defined radar system comprises an arbitrary waveform generator (AWG) 402 which generates an arbitrary, user-defined waveform in a digital signal for transmission, after conversion with a digital-to-analog converter 402*a*. The transmission signal 303 is coupled to a transmission antenna 204 as in the conventional case, preferably after amplification with amplifier 203.

The receiver components comprise a receive antenna 101 for coupling impingent signals to the receiver as a received signal 116 via a low noise amplifier (LNA) 102, again, as in the conventional case described above. However instead of employing a series of local oscillators, which induce errors, and the attendant mixers and filters, the receive signal 116 is coupled directly to a high speed analog-to-digital converter (ADC1) 313, the output of which is coupled to an adaptive processing unit (APU) 403. The transmission signal 303 is also coupled to the APU 403 via a coupler 202 to provide a reference signal 208 that is also converted back to a digital signal through a high-speed ADC 314 the output of which is provided to the APU 403. In addition, the APU 403 receives geo-position information from either or both of an inertial measuring unit (IMU) 405 and a global positioning system (GPS) 404. Finally, control functions of the entire system may be achieved by a single common processor, or computer, 401, described in further detail below.

The AWG preferably allows a user to custom define a wide variety of analog waveform parameters of the transmission pulse 303, including frequency, bandwidth, sweep characteristics, Pulse Repetition Interval (PRI), and pulse length. The AWG 402 generates signals that may be uniform from signal to signal, or, wherein each transmitted signal differs in some characteristic, either randomly or according to a pre-programmed sequence. A suitable example of such a device is found in the EUVIS DSM303-V4 Arbitrary Chirping Module offered by Euvis, Inc., of Simi Valley, Calif. In practice, the frequency sweep ranged from 100 MegaHertz (MHz) to about 10 GHz. Additionally, suitable high-speed ADCs 313, 314 are found in the Guzik WDM 5082 2-channel high-speed digitizer operating in a dual-channel 20 Giga-Samples-Per-Second (GSps) mode from Guzik Technical Enterprises of Mountain View, Calif. ADCs 313, 314, may be one ADC and can accept both the received signal 116 and the reference signal 208 simultaneously and output both channels in parallel over a memory for processing by the APU 403.

Figure 5:
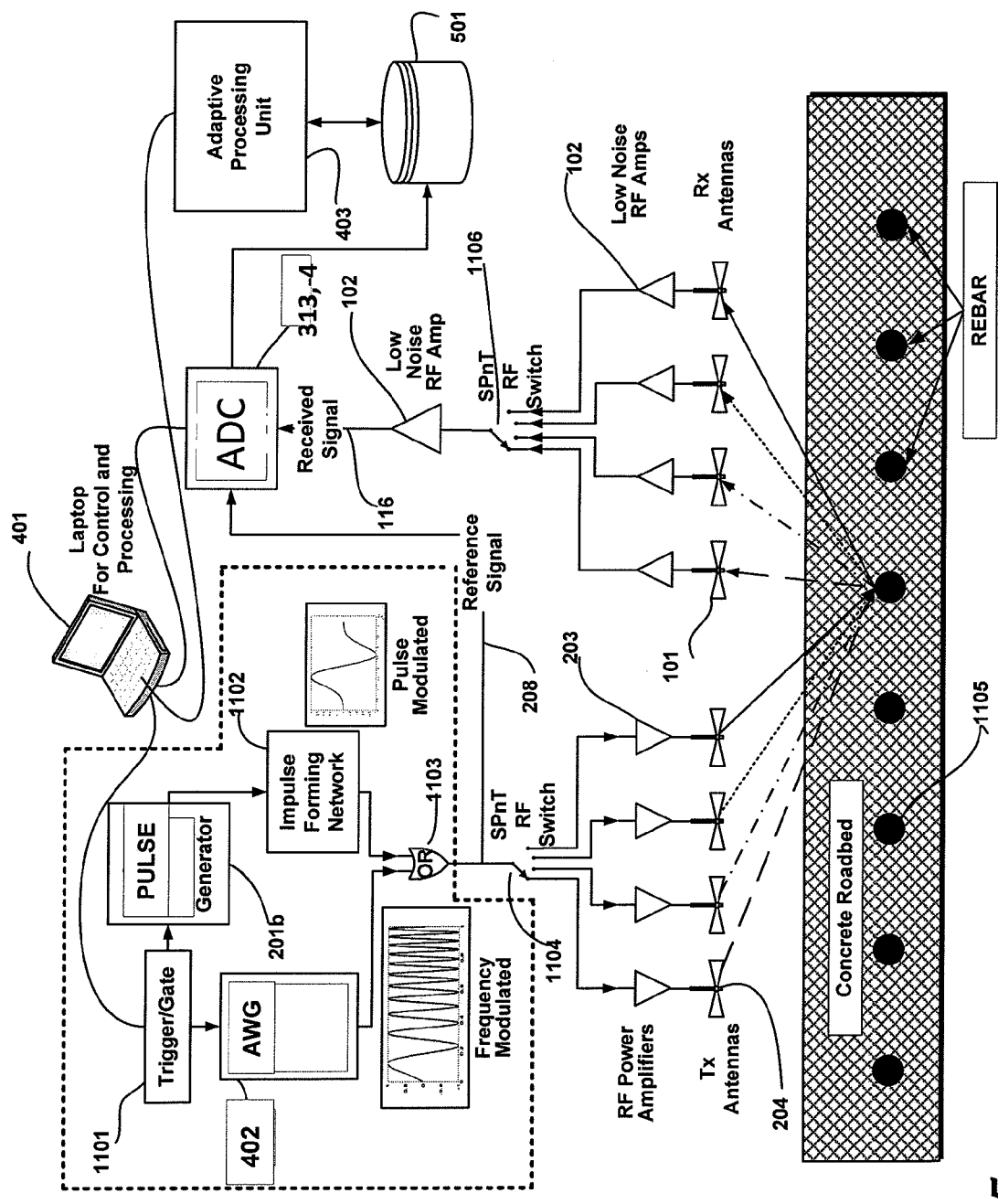
FIG. 5 is a functional schematic depicting an embodiment of a direct-to-digital software defined radar employing both frequency modulation and pulse modulation RF techniques.

FIG. 5 depicts a more detailed version of An exemplary software-defined radar developed for practical application as a ground-penetrating radar. This embodiment successfully demonstrated the use of two different waveforms for two distinctly different functions: (1) Non-destructive inspection (NDI) of highway bridge reinforcement bar (REBAR) delamination; and (2) Detection and classification of deep tunnels for Homeland Defense applications.

A control computer 401 provides all control and signal/image processing functions. A timing/synchronization source 1101 provides a trigger signal, at appropriate intervals, to either an AWG 402 or, optionally, a pulse generator 201*b*. A suitable pulse generator is the Model 3600 Gauss impulse generator offered by Picosecond Pulse Laboratory (PSPL) of Boulder, Colo. Accordingly, the system is capable of either FM or pulse modulation modes. It will be appreciated, however, that because the Gauss impulse couples poorly with an antenna, it may be necessary to modify the pulse shape, for example, to a "Derivative of Gaussian" monocycle with a pulse shaper 1102, for example, a PSPL Model 5212A Impulse Forming Network. It is important to note that in a future embodiment of this invention, both FM and PM waveforms may be generated with a single Direct Digital Synthesizer (DDS) board [8] for enhanced flexibility and programmability.

The generated waveform is then applied to the input of a switch, preferably a Single-Pole N-Throw (SPnT) RF switch 1104, following a logical OR gate 1103. The output port of the RF switch 1104 is controlled by the Trigger 1101, and the signal is passed to one or more transmit amplifier/antenna chains 203, 204 in sequence. The antenna assembly 204 is preferably designed to operate over a very wide bandwidth, from less than 100 MHz to greater than 3.0 GHz.

The transmitted waveform travels through the transmission medium, in this example, concrete, and interacts with the embedded objects, e.g., REBAR 1105. The reflected waveform is received by an array of receive antennas 101, and coupled to low noise RF amplifiers 102, possibly through an RF switch 1106 if using multiple receive antennas. Following amplification, the received signal 116 may be amplified a final time by an additional low-noise amplifier 102 depending upon any deleterious effects imparted by the switch 1106.

The amplified RF signal is then directly sampled and digitized by a high-speed ADC 313. It will be appreciated that the received signal is digitized without down-conversion to IF stages, eliminating the need for superfluous mixers, LO's and filters. The digitized signal is then coupled to the APU 403, performs Near-Real-Time (NRT) signal and image processing.

Figure 4:
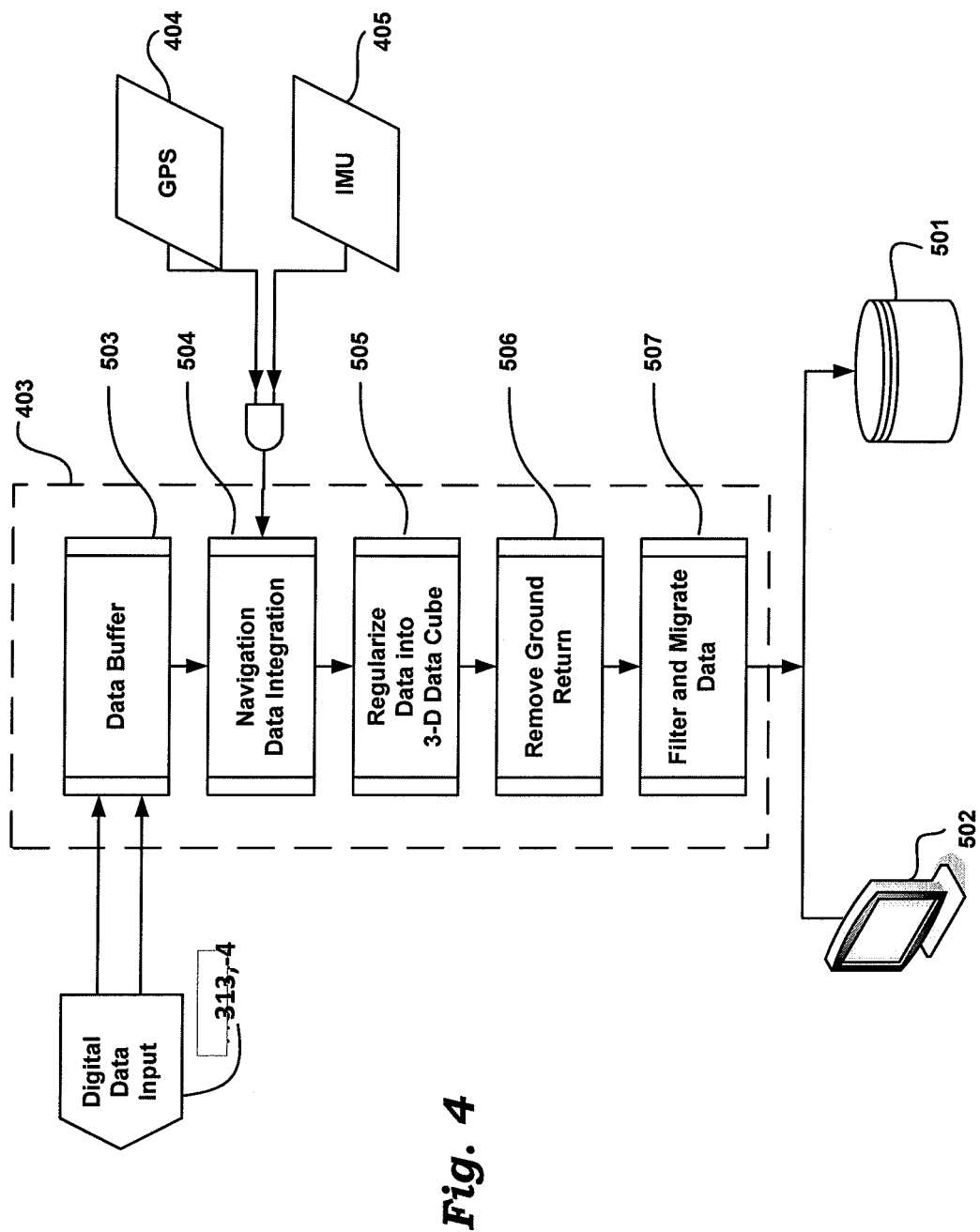
FIG. 4 is a flow diagram of an exemplary process flow of the radar data processing as received at an adaptive processing unit (APU) from the ADCs.

FIG. 4 depicts the modules comprising the APU 403. As described above with reference to FIGS. 3 and 5, the incoming raw RF signals are immediately digitized in the ADC 313, at a sampling rate equal to or greater than the Nyquist rate, and are then passed to a data buffer 503 which collects the data into packets, or frames (collectively, "buffered data"), to reduce the effective data rate into the processing modules which follow. In addition, the APU 403 receives the reference signal 208 after it is digitized by the ADC 314, and which the APU 403 may digitally correlate with the digitized receive signal. When this function is performed, the resulting data output is a correlated signal data, which is buffered as described above.

The buffered data are input to a navigation data integration module 504 that interleaves navigation data from GPS 404 and IMU 405 with the buffered data and outputs a resulting data stream that identifies data according to time and geolocation. Thus, any particular packet of radar data may be time- and geolocation-indexed commensurate with the precision of the GPS sampling, for example, in the prototype described above, 5 Hz and +/−5 cm distance.

Geo-referenced data are then provided to a radar data arrangement module 505 that arranges the data into a 3-dimensional "cube" data structure, which is a conventionally-used, standard representation of radar data regardless of radar type. 3-D data cube structure may arrange data according to Range, Azimuth and Elevation data, or may arrange data by down-range, cross-range and depth, depending on the data that is most relevant to the desired function of the system. In yet another embodiment that may involve Space-Time Adaptive Processing (STAP) or Ground Moving-Target Indicator (GMTI), the 3-D data cube would, for example, arrange the data according to pulse repetition interval, antenna element and range gate.

Figure 6B:
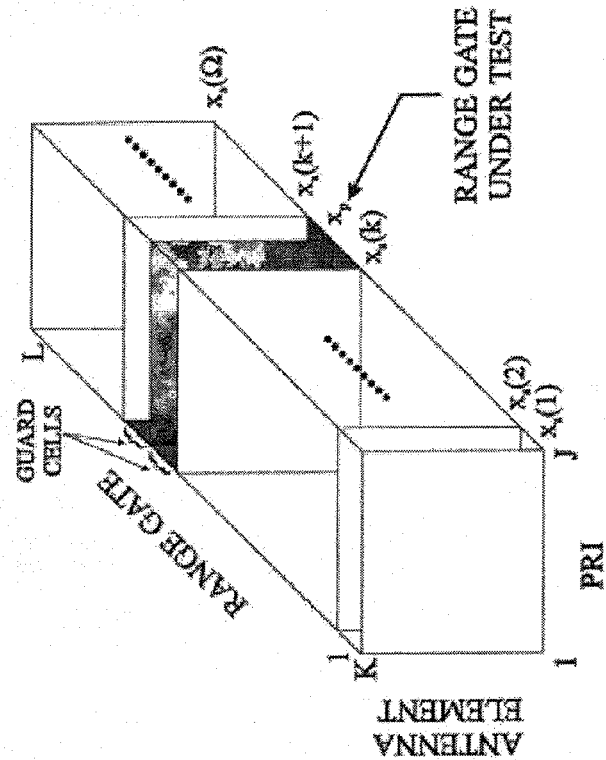
FIGS. 6A and 6B depict an example of creation of a 3-dimensional radar "data cube" that takes place in the APU.
Figure 6A:
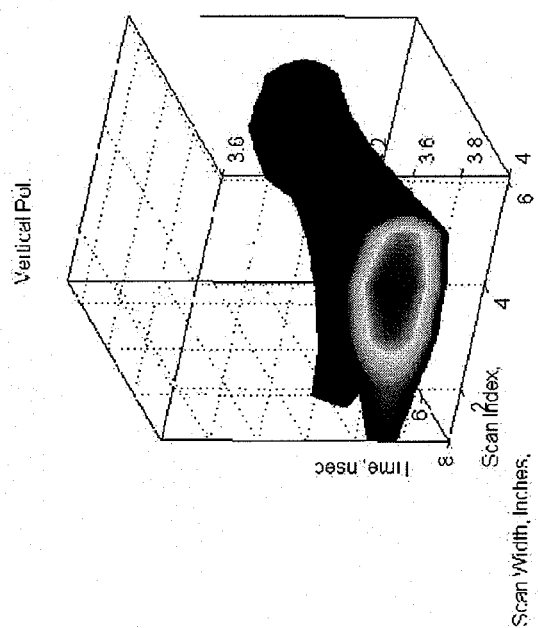

FIG. 6 depicts two possible representations of the 3-D data cube. FIG. 6A represents a 3-D image of a section of reinforcing bar (REBAR) where the axes are scan length, scan depth and antenna index. FIG. 6B illustrates a classic STAP data cube.

The 3-D data cube, in the case of GPR, can be viewed in one of four ways: A-Scan, B-Scan, C-Scan, and finally, a 3-D view. The A-scan is a time-amplitude plot and represents a single pulse return with the GPR antenna at a specific location above the ground. The B-scan represents a series of A-scans as the GPR is swept in a straight line above the ground, at a constant height.

Figures 7, 8:
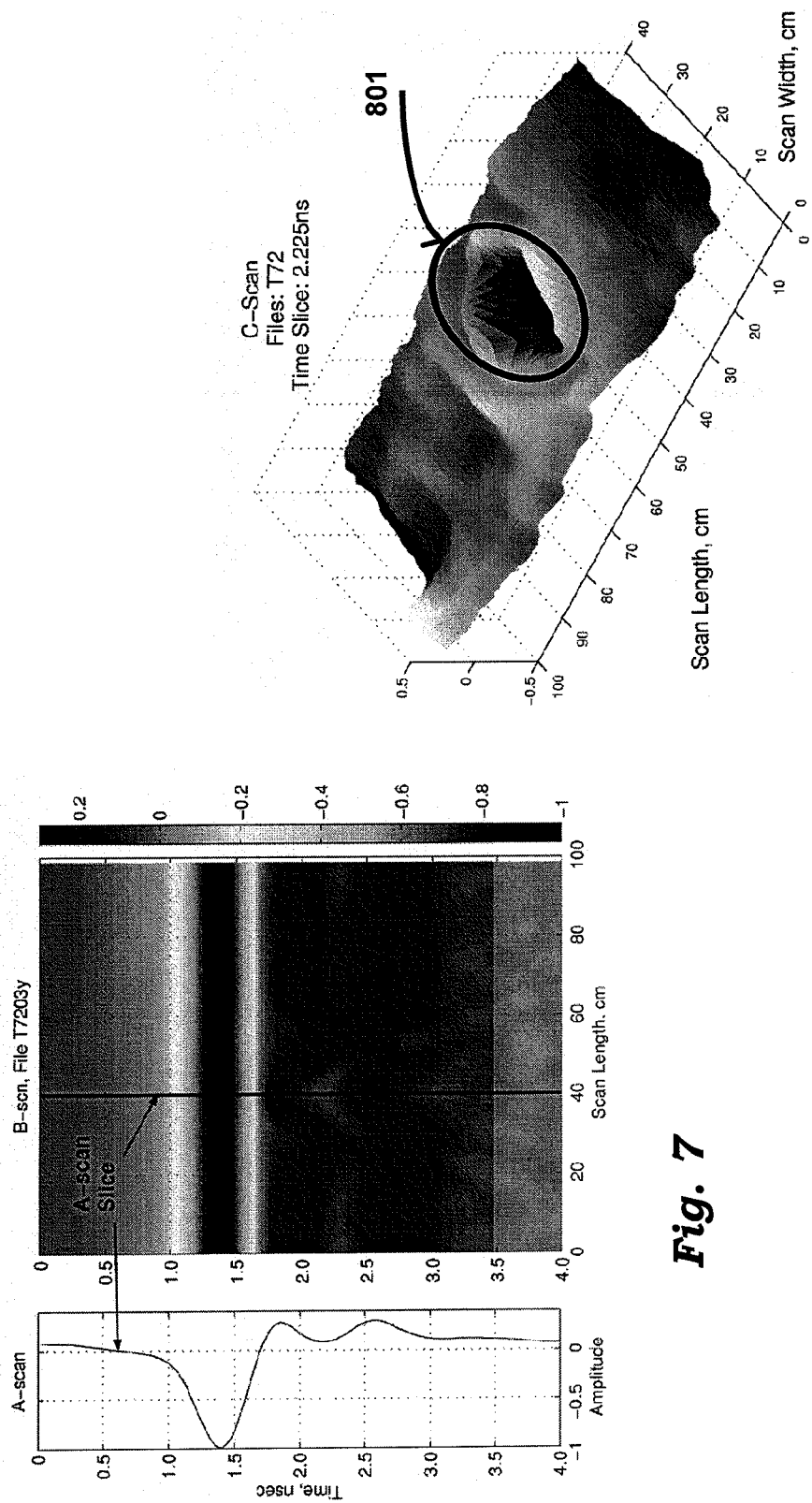
FIGS. 7 and 8 illustrate various visualizations of the 3-D radar data cube as applied to Ground Penetrating Radar.

FIG. 7 illustrate the concept of the A-scan and B-scan. The ground clutter return is shown as a dark band in the B-scan and is represented by the large negative amplitude of the A-scan. The target location is roughly identified by the hyperbolic traces in the B-scan. The ground return is much larger than the target return and must be removed as described later. The C-scan, depicted in FIG. 8, is represented by a horizontal slice of a number of stacked B-scans. FIG. 8 illustrates the appearance of a target 801 at a specific depth (vertical scale).

A declutter module 506 removes the majority of clutter and "ground return," applying either of three approaches: (1) moving-average cancellation; (2) clutter estimation by system identification; and (3) singular value decomposition. Either of the three methods are software-selectable depending upon conditions. Other methods of declutter functions may be used as well, including those now known or hereafter developed.

A filter and migration Module 507 applies 3-D filtering to reduce noise and various "edge effects" which are artifacts that may be induced by the declutter module 506. 3-D filtering is performed using a 3-D convolution technique, or similar processes, examples of which are those used in 3-D magnetic resonance imaging and tomography. Particularly, for GPR application, the thus filtered 3-D data are preferably "migrated" in order to refine target location information for detected targets and further reduce noise, which may be accomplished using algorithms similar to techniques used in locating seismic phenomena. The result of data migration is to clarify the smeared appearance of typical GPR data and "focus" it onto a more clearly defined location.

Following the processing described in the above paragraphs, the resulting 3-D data can be displayed on the laptop display or other display device 502, and can also be recorded on a media storage device 501.

Many of the processes performed by the above-described embodiment(s) may be performed by a computer-based apparatus. Specifically, direct-to-digital software radar, as described and shown above may be may be achieved, in part, through the execution of software one or more processors, or computers, and may be locally or remotely accessible. The computers may be uniprocessor or multiprocessor machines. Additionally, these computers include an addressable storage medium or computer accessible medium, such as random access memory (RAM), erasable programmable read-only memory (EPROM), read-only memory (ROM), hard disks, floppy disks, laser disk players, optical disk players, digital video devices, and other components operable to transmit and/or store data.

The processor(s) 401 can be the same as the processor controlling the transmitting antenna firing or it can be separate, and can be implemented by a field programmable gated array (FPGA), application specific integrated chip (ASIC), a central processing unit (CPU) with a memory or other logic device.

The processor in effect comprises a computer system. Such a computer system includes, for example, one or more processors that are connected to a communication bus. The computer system can also include a main memory, preferably a random access memory (RAM), and can also include a secondary memory. The secondary memory can include, for example, a hard disk drive and/or a removable storage drive. The removable storage drive reads from and/or writes to a removable storage unit in a well-known manner that includes a computer usable storage medium having stored therein computer software and/or data. The secondary memory can include other similar means for allowing computer programs or other instructions to be loaded into the computer system.

Computer programs (also called computer control logic) are stored in the main memory and/or secondary memory. Computer programs can also be received via the communications interface. Such computer programs, when executed, enable the computer system to perform certain features of the present invention as discussed herein. In particular, the computer programs, when executed, enable a control processor to perform and/or cause the performance of features of the present invention. Accordingly, such computer programs represent controllers of the computer system of a radar system. The control logic (software), when executed by a control processor, causes the control processor to perform certain functions of the invention as described herein.

The control logic conventionally includes the manipulation of data bits by the processor and the maintenance of these bits within data structures resident in one or more of the memory storage devices. Such data structures impose a physical organization upon the collection of data bits stored within computer memory and represent specific electrical or magnetic elements. These symbolic representations, examples of which are provided above, are the means used by those skilled in the art to effectively convey teachings and discoveries to others skilled in the art.

The control logic is generally considered to be a sequence of computer-executed steps. These steps generally require manipulations of physical quantities. Usually, although not necessarily, these quantities take the form of electrical, magnetic, or optical signals capable of being stored, transferred, combined, compared, or otherwise manipulated.

It should also be understood that the programs, modules, processes, methods, and the like, described herein are but an exemplary implementation and are not related, or limited, to any particular computer, apparatus, or computer language. Rather, various types of general purpose computing machines or devices may be used with programs constructed in accordance with the teachings described herein.

As described above and shown in the associated drawings, the present invention comprises an apparatus for direct-to-digital software-defined radar. While particular embodiments of the invention have been described, it will be understood, however, that the invention is not limited thereto, since modifications may be made by those skilled in the art, particularly in light of the foregoing teachings. It is, therefore, contemplated by the appended claims to cover any such modifications that incorporate those features or those improvements that embody the spirit and scope of the present invention.

What is claimed is:

1. A radar system comprising:
   a receive antenna having an output comprising a received signal;
   an arbitrary waveform generator for providing an arbitrarily defined waveform signal, said arbitrary waveform generator having an output comprising a first reference signal corresponding to said received signal;
   an analog-to-digital convertor having a first input directly coupled to said received signal and configured to the output of said receive antenna for the purpose of converting said received signal to a digital received signal;
   a computer-based adaptive processor having a first input for receiving said digital received signal and a second input for receiving said first reference signal, said processor being configured with a computer-readable media with control logic stored thereon which causes said adaptive processor to perform a process comprising the steps of:
   i. obtaining digitized signal data by correlating said first digital signal with a digitized first reference signal;
   ii. obtaining geo-indexed data by identifying said digitized data according to geo-location data from a geo-positioning device;
   iii. arranging said geo-indexed data according to a three-dimensional information structure, said structure comprising three of the following data parameters: range, depth, azimuth, elevation, pulse width, pulse repetition interval, range gate, scan length, antenna element, and cross-range;
   iv. decluttering said arranged data; and
   v. migrating said arranged data.

2. The radar system of claim 1, further comprising a pulse generator having an output comprising a second reference signal and wherein said adaptive processor unit further comprises an input for receiving a digitized second reference signal.

3. The radar system of claim 2, wherein said step of obtaining digitized signal data comprises correlating said first digital signal with either of said digitized first reference signal and said digitized second reference signal.

4. A radar system consisting essentially of:
   a signal waveform generator for providing a transmit signal that is arbitrarily defined, and a reference signal corresponding to said transmit signal;
   a transmit antenna for coupling said transmit signal to a transmission medium;
   a receive antenna for coupling a reflected transmit signal from said transmission medium to a receiver and outputting a received signal, said received signal corresponding to said transmit signal;
   one or more high-speed digitizers directly responsive to said receive antenna for converting said received signal into a digitized received signal and for converting said reference signal into a digitized reference signal;
   a processor responsive to said digitizer and said waveform generator, said processor configured with control logic which, when executed, performs the steps of:
   i. obtaining digitized received signal data by correlating said digitized received signal with said digitized reference signal;
   ii. indexing said digitized received signal data with time and geo-location data from a geo-positioning device;
   iii. arranging indexed data according to a data structure, said data structure configured to reference said indexed data according to at least three parameters consisting of range, depth, azimuth, elevation, pulse width, pulse repetition interval, range gate, scan length, antenna element, and cross-range; and
   iv. decluttering said arranged data by eliminating data indicative of non-target reflections.

5. The radar system of claim 4, wherein said processor is configured with control logic which, when executed, causes the processor to further perform the step of:
   refining detected target data.

6. The radar system of claim 1, further comprising a low noise amplifier interposed between said antenna and said analog-to-digital converter.

* * * * *